United States Patent
Bouda (10) Patent No.: US 7,639,946 B2
(45) Date of Patent: Dec. 29, 2009

(54) DISTRIBUTION NODE FOR AN OPTICAL NETWORK

(75) Inventor: Martin Bouda, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 541 days.

(21) Appl. No.: 11/619,945

(22) Filed: Jan. 4, 2007

(65) Prior Publication Data

US 2008/0131129 A1 Jun. 5, 2008

Related U.S. Application Data (60) Provisional application No. 60/756,925, filed on Jan. 6, 2006.

(51) Int. Cl.
  *H04J 14/00* (2006.01)
(52) U.S. Cl. .................. 398/68; 398/72; 398/82
(58) Field of Classification Search ............ 398/66, 398/67, 68, 69, 70, 71, 72, 82
See application file for complete search history.

(56) References Cited

U.S. PATENT DOCUMENTS

| | | | |
|---|---|---|---|
| 4,244,045 A * | 1/1981 | Nosu et al. ............ | 398/86 |
| 4,555,810 A | 11/1985 | Khoe et al. | |
| 5,285,305 A | 2/1994 | Cohen et al. | |
| 5,321,541 A | 6/1994 | Cohen | |
| 5,440,416 A | 8/1995 | Cohen et al. | |
| 5,579,421 A | 11/1996 | Duvall et al. | |
| 5,583,683 A * | 12/1996 | Scobey ............ | 398/79 |
| 5,694,234 A | 12/1997 | Darcie et al. | |
| 5,926,298 A | 7/1999 | Li | |
| 6,144,472 A | 11/2000 | Knox | |
| 6,163,637 A | 12/2000 | Zirngibl | |
| 6,411,410 B1 | 6/2002 | Wright et al. | |

(Continued)

FOREIGN PATENT DOCUMENTS

EP   1 028 331 A2   8/2000

(Continued)

OTHER PUBLICATIONS

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

(Continued)

*Primary Examiner*—Christina Y Leung
(74) *Attorney, Agent, or Firm*—Baker Botts L.L.P.

(57) ABSTRACT

A distribution node for an optical network is provided that includes an integrated filter module comprising a first thin-film and a second thin-film coupled to a common substrate and operable to receive a first downstream signal at the substrate comprising at least traffic in a first wavelength and a second wavelength, transmit the traffic in the first wavelength from the first thin-film to a first plurality of downstream terminals, reflect the traffic in the second wavelength to the second thin-film, and transmit at least the traffic in the second wavelength from the second thin-film to a second plurality of downstream terminals. A traffic distributor is operable to receive a second downstream signal comprising at least traffic in a third wavelength and forward the traffic in the third wavelength to the common substrate for distribution to the first plurality and second plurality of downstream terminals.

20 Claims, 6 Drawing Sheets

U.S. PATENT DOCUMENTS

| | | | |
|---|---|---|---|
| 6,498,876 | B1 | 12/2002 | Liu et al. |
| 6,697,574 | B2 * | 2/2004 | Frigo et al. ................... 398/71 |
| 6,767,139 | B2 | 7/2004 | Brun et al. |
| 6,819,871 | B1 | 11/2004 | Baldwin et al. |
| 7,085,495 | B2 * | 8/2006 | Birk et al. ..................... 398/71 |
| 7,245,829 | B1 | 7/2007 | Sindile |
| 7,389,048 | B2 | 6/2008 | Kani et al. |
| 2002/0145779 | A1 * | 10/2002 | Strasser et al. .............. 359/124 |
| 2002/0196491 | A1 | 12/2002 | Deng et al. |
| 2003/0002102 | A1 | 1/2003 | Khalfallah et al. |
| 2004/0001718 | A1 | 1/2004 | Matthews et al. |
| 2004/0131357 | A1 | 7/2004 | Farmer et al. |
| 2004/0184806 | A1 | 9/2004 | Lee et al. |
| 2005/0129404 | A1 | 6/2005 | Kim et al. |
| 2005/0175343 | A1 | 8/2005 | Huang et al. |
| 2005/0175344 | A1 | 8/2005 | Huang et al. |
| 2005/0180689 | A1 | 8/2005 | Kozhevnikov et al. |
| 2006/0056849 | A1 | 3/2006 | Pamart et al. |
| 2006/0153567 | A1 | 7/2006 | Kim et al. |
| 2007/0092249 | A1 | 4/2007 | Akasaka et al. |
| 2007/0092250 | A1 | 4/2007 | Bouda et al. |
| 2007/0092251 | A1 | 4/2007 | Bouda et al. |
| 2007/0092252 | A1 | 4/2007 | Bouda et al. |
| 2007/0092253 | A1 | 4/2007 | Bouda |
| 2007/0092254 | A1 | 4/2007 | Bouda |
| 2007/0092255 | A1 | 4/2007 | Bouda |
| 2007/0166037 | A1 | 7/2007 | Bouda et al. |
| 2007/0166043 | A1 | 7/2007 | Bouda |
| 2007/0183779 | A1 | 8/2007 | Bouda |
| 2007/0280690 | A1 | 12/2007 | Bouda |
| 2007/0280691 | A1 | 12/2007 | Bouda |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-µm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. 1, Jan. 1991, pp. 113-120.

Lin, "Passive Optical Subscriber Loops with Multiaccess," Journal of Lightwave Technology, vol. 7, No. 11, Nov. 1989, pp. 1769-1777.

MOOG Component Group, "(Mems)* Singlemode Fiber Optic Switch," FO5935, 2 pages, 2005.

Light Reading—Networking the Telecom Industry, PON & FTTx Update, Introduction, Aug. 8, 2005, Light Reading, printed from web site Jan. 26, 2006, pp. 1-11, Retrieved from website Aug. 8, 2005.

ITU-T Telecommunication Standardization Sector of ITU-T, G.984. 1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.

ITU-T Telecommunication Standardization Sector of ITU-T, G.983. 1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.

ITU-T Telecommunication Standardization Sector of ITU-T, G.983. 3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.

ITU-T Telecommunication Standardization Sector of ITU-T, G.984. 3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

ITU-T Telecommunication Standardization Sector of ITU-T, G.984. 3, Series G: Study Period 2005-2008, Updated Revised Amendment 1, : "Amendment to Gigabit-Capable Passive Optical Network (G-PON): Transmission Convergence Layer Specification (2004)," pp. 1-39, May 16-27, 2005.

Green, Paul E. Jr., Telecommunications Consultant, "Fiber-to-the-Home White Paper,", Feb. 21, 2003, pp. 1-21.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15, 2001 through Oct. 26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol. part 1, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps., 9 pps. drawings, U.S. Appl. No. 11/347,434.

Bouda, "A Distribution Node for a Wavelength-Sharing Network," filed Feb. 3, 2006, 64 pps., 9 pps. drawings, U.S. Appl. No. 11/347,612.

Bouda et al., "Distribution Components for a Wavelength-Sharing Network," filed Feb. 3, 2006, 69 pps., 9 pps. drawings, U.S. Appl. No. 11/347,585.

Bouda et al., "Upgradeable Passive Optical Network," filed Feb. 3, 2006, 66 pps, 9 pps, drawings, U.S. Appl. No. 11/347,446.

Palacharla et al., "System and Method for Managing Network Components in a Hybrid Passive Optical Network," filed Oct. 25, 2006, 43 pps, 4 drawings, U.S. Appl. No. 11/552,696.

Bouda, "System and Method for Transmitting Traffic in a Plurality of Passive Optical Networks," U.S. Appl. No. 11/627,809, filed Jan. 26, 2007, 35 pps., 5 pps. drawings.

Bouda, "System and Method for Transmitting Upstream Traffic in an Optical Network," U.S. Appl. No. 11/426,875, filed Jun. 27, 2006, 49 pps., 5 pps. drawings.

Bouda, "System and Method for Managing Different Transmission Architectures in a Passive Optical Network," U.S. Appl. No. 11/627,793, 42 pps., 4 pps. drawings.

Bouda, "System and Method for Distributing Traffic in an Optical Network," U.S. Appl. No. 11/426,879, filed Jun. 27, 2006, 43 pps., 4 pps. drawings.

Akasaka et al., "System and Method for Traffic Distribution in an Optical Network," U.S. Appl. No. 11/426,884, filed Jun. 27, 2006, 71 pps., 12 pps. drawings.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optical Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

* cited by examiner

DISTRIBUTION NODE FOR AN OPTICAL NETWORK

BACKGROUND

In recent years, a bottleneck of communication networks has occurred in the portion of the network known as the access network. Bandwidth on long haul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the Internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GE-PONs).

Although PSPON systems provide increased bandwidth in access networks, demand continues to grow for higher bandwidth. One solution, wavelength division multiplexing PON (WDMPON), would increase downstream (and upstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand.

SUMMARY

In accordance with the teachings of the present invention, distribution components for communicating traffic in an optical network are provided. In a particular embodiment, a distribution node for an optical network includes an integrated filter module comprising a first thin-film and a second thin-film coupled to a common substrate and operable to receive a first downstream signal at the substrate comprising at least traffic in a first wavelength and a second wavelength, transmit the traffic in the first wavelength from the first thin-film to a first plurality of downstream terminals, reflect the traffic in the second wavelength to the second thin-film, and transmit at least the traffic in the second wavelength from the second thin-film to a second plurality of downstream terminals. A traffic distributor is operable to receive a second downstream signal comprising at least traffic in a third wavelength and forward the traffic in the third wavelength to the common substrate for distribution to the first plurality and second plurality of downstream terminals.

Technical advantages of one or more embodiments of the present invention may include providing a cost-effective wavelength router at a distribution node. Particular embodiments may provide a passive optical network with more downstream bandwidth than a typical PSPON yet avoid the cost and unreliability of WDMPONs by using a more cost-efficient variation of WDMPON features and components for transmission in the downstream direction. In these embodiments, groups of ONUs may receive downstream WDM wavelengths from a distribution node that routes the wavelengths, allowing for relatively coarse (and thus less expensive) wavelength multiplexing optics in the passive distribution network.

Particular embodiments may avoid the cost of WDMPONs by providing a wavelength router including an integrated filter module as opposed to a cascading filter arrangement. The integrated filter module includes a shared substrate that combines, filters, and forwards light of particular wavelengths. Using a shared substrate and avoiding the use of a costly cascading filter arrangement may provide for a less costly network. Such a shared substrate also requires a minimal number of costly fiber connections. These embodiments also provide a compact solution that ensures that any temperature drift is consistent for each of the wavelengths, thereby improving wavelength accuracy.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
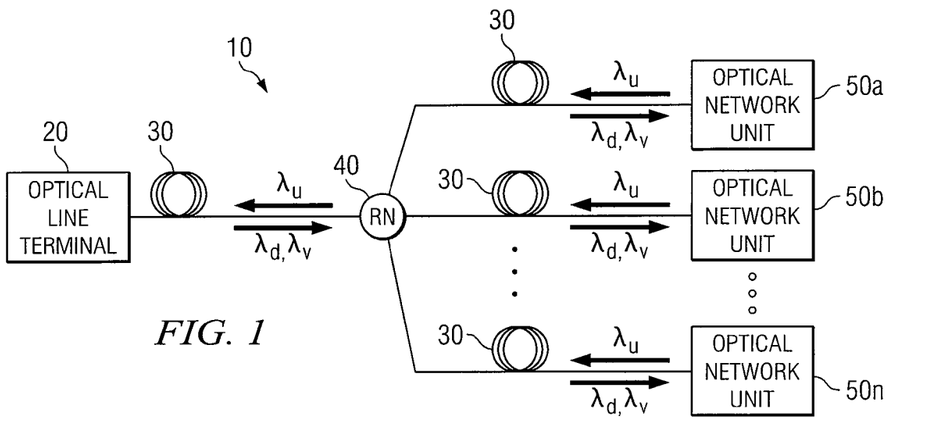
FIG. 1 is a diagram illustrating an example power splitting PON (PSPON)

FIG. 1 is a diagram illustrating an example Power Splitting Passive Optical Network (PSPON) 10. Typically, PSPONs have been employed to address the bottleneck of communications networks in the portion of the network known as the access network. In recent years, bandwidth on long haul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the Internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, BPONs are currently being deployed to provide hundreds of megabits per second capacity shared by thirty-two users. GPONs, which typically operate at speeds of up to 2.5 gigabits per second (GB/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a broadband PON (BPON), a gigabit PON (GPON), a gigabit Ethernet PON (GEPON), or any other suitable PSPON. A feature common to all PSPONs 10 is that the outside fiber plant is completely passive.

OLT 20 (which may be an example of an upstream terminal) may reside at the carrier's central office (where it may be coupled to a larger communication network) and includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal).

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_v$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater.

A switch to a wavelength division multiplexing PON (WDMPON), in which each ONU would receive and transmit traffic over a dedicated downstream and upstream wavelength, may dramatically increase bandwidth at the access network by multiplying network capacity by the number of wavelengths carried. However, the increase in bandwidth using WDMPONs comes at a significant cost. For example, WDMPONs require highly stable WDM components to distribute narrowly spaced dedicated wavelengths (or channels) from the OLT to each ONU and from each ONU to the OLT. For example, the multiplexer/demultiplexer at RN 140 and the receivers and transmitter at each ONU 150 must all be precisely tuned. In practice, the density of the channels requires wavelength stabilized transmitters and temperature insensitive multiplexers, both of which add significantly to the cost of the network. Many WDMPON components (including colorless ONUs) are also expensive and as-of-now unproven technologies whose reliability has not been determined. Thus, according to some estimates, implementing a WDMPON may cost two to five times as much as a GPON and WDMPON may be unreliable.

Figure 2:
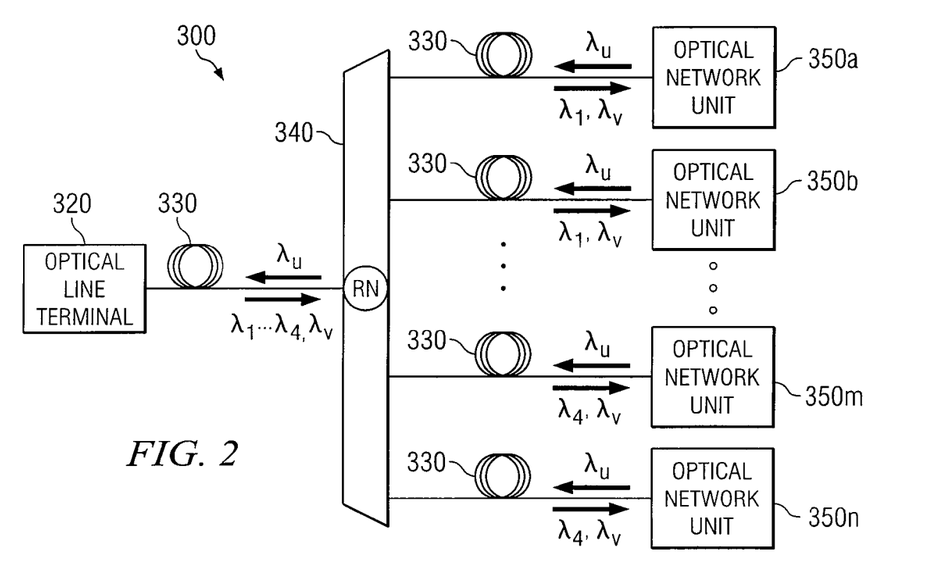
FIG. 2 is a diagram illustrating an example hybrid PON (HPON)

FIG. 2 is a diagram illustrating an example hybrid PON (HPON) 300. Example HPON 300 comprises OLT 320, optical fiber 330, RN 340, and ONUs 350. Example HPON 300, a hybrid between a PSPON and a WDMPON, provides a more cost-efficient solution for many network operators. Example HPON 300 provides greater downstream capacity without incurring many of the costs of WDMPON by having groups of two or more ONUs 350 share downstream WDM wavelengths, thus reducing the need for densely multiplexed wavelengths and the need for highly stable multiplexers and transceivers. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs.

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a HPON. Using shared wavelengths in HPON permits the use of less costly optics components (such as, for example, low-cost CWDM optics), allowing for increased capacity at a lower cost than WDM-PON.

For example, sharing downstream wavelengths in HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, HPON 300 is a much more attractive solution for many network operators.

OLT 320 of HPON 300 (which may be an example of an upstream terminal) may reside at the carrier's central office and comprises four transmitters operable to transmit downstream traffic over $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 (including traffic in multiple sub-bands of $\lambda_u$) and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain HPONs 300, optical fiber 330 may comprise, for example, bidirectional fiber. In other HPONs 300, optical fiber 330 may comprise two distinct fibers.

RN 340 of HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic over $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic over $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic over $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 330 to OLT 320. OLT 320 receives the signal at its receiver and processes the traffic.

Modifications, additions, or omissions may be made to the HPON 300 described without departing from the scope of the invention. The components of the HPON 300 described may be integrated or separated according to particular needs. Moreover, the operations of the HPON 300 described may be performed by more, fewer, or other components.

Figure 3:
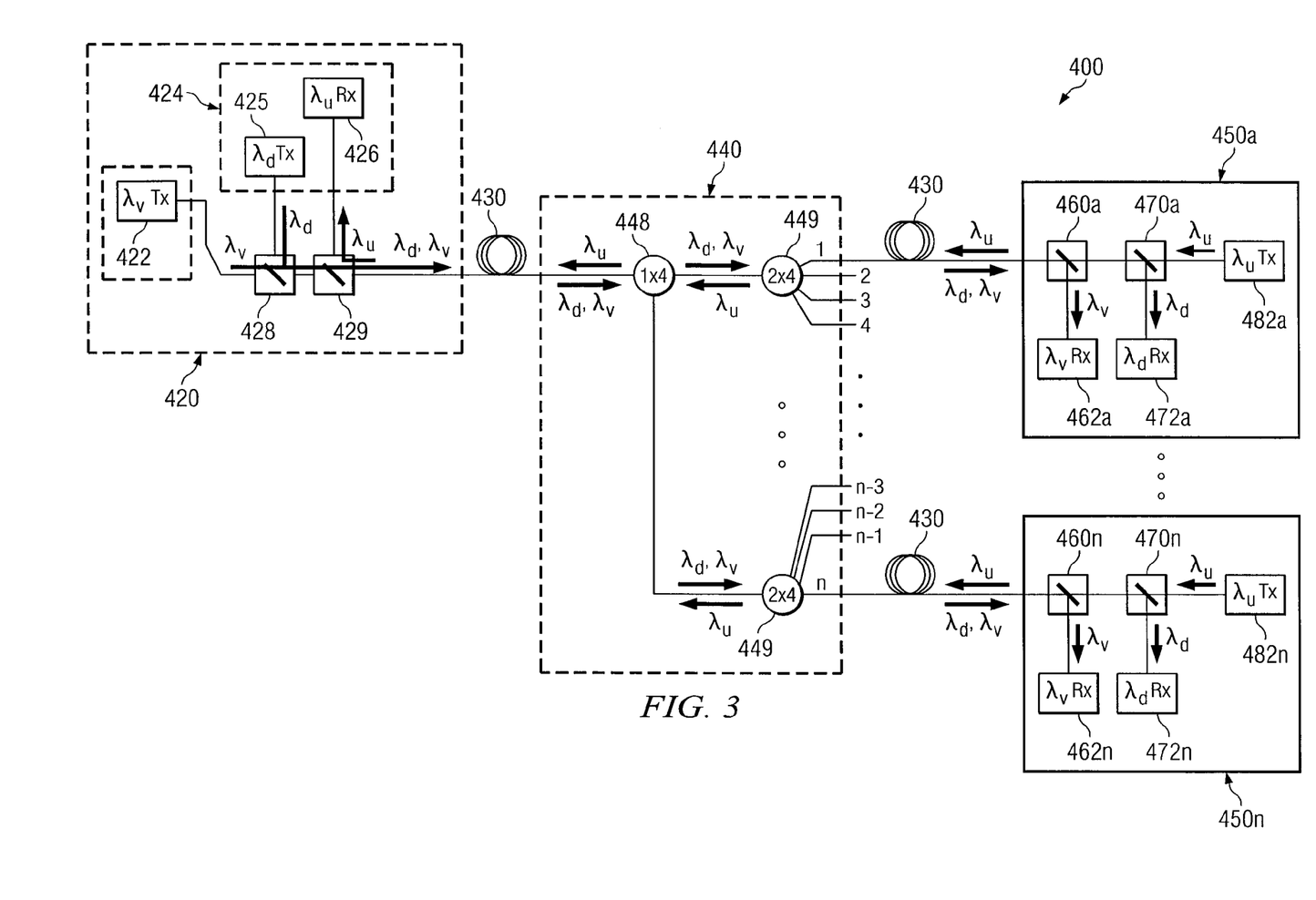
FIG. 3 is a diagram illustrating an example PSPON in more detail.

FIG. 3 is a diagram illustrating an example PSPON 400 in more detail. Example PSPON 400 comprises OLT 420, optical fiber 430, RN 440, and ONUs 450. Referring back to the discussion of PSPONs, PSPONs may transmit downstream traffic over two wavelengths $\lambda_d$ and $\lambda_v$, and upstream traffic over time-shared wavelength $\lambda_u$. The PSPON 400 may be provided for any PSPON such as those described above in conjunction with PSPON 10 of FIG. 1.

OLT 420 of example PSPON 400 (which may be an example of an upstream terminal) comprises a transmitter 422, transceiver 424 comprising transmitter 425 and receiver 426, and filters 428 and 429. Transmitter 422 may comprise any suitable transmitter and is operable to transmit traffic over wavelength $\lambda_v$. Transmitter 422 of typical PSPONs may transmit analog video traffic (although transmitter 422 may alternatively transmit digital data traffic). Transmitter 425 of transceiver 424 may comprise any suitable transmitter operable to transmit traffic over wavelength $\lambda_d$. Transmitter 425 of typical PSPONs may transmit digital data traffic. Transmitters 422 and 425 may transmit at any suitable bit rate. Receiver 426 of transceiver 424 may comprise any suitable receiver operable to receive upstream traffic from ONUs 450 carried over $\lambda_u$. Filter 428 comprises any suitable filter operable to pass the traffic in $\lambda_v$ and direct the traffic in $\lambda_d$ to RN 440. The traffic in $\lambda_d$ and $\lambda_v$ may also be combined into one signal at filter 428. Filter 429 comprises any suitable filter operable to forward the traffic in downstream wavelengths $\lambda_d$ and $\lambda_v$ to RN 440 and direct the traffic in upstream wavelength $\lambda_u$ to receiver 426.

Optical fiber 430 may comprise any suitable fiber to carry upstream and downstream traffic. In particular example PSPON 400, optical fiber 430 may comprise bidirectional optical fiber. Alternatively, optical fiber 430 may comprise one fiber for downstream traffic and one fiber for upstream traffic.

RN 440 comprises a primary power splitter 448 and secondary power splitters 449. Primary power splitter 448 comprises any suitable power splitter, such as an optical coupler, and is operable to split a downstream optical signal into a suitable number of copies and to combine a plurality of upstream optical signals into one signal. In the illustrated example, primary power splitter 448 is operable to broadcast the traffic in $\lambda_d$ and $\lambda_v$ by splitting the downstream signal comprising these wavelengths into four copies (which are then forwarded to secondary power splitters 449 for eventual receipt by all ONUs 450). Primary power splitter 448 is also operable to combine upstream traffic transmitted over $\lambda_u$ by ONUs 450 into one signal. Although primary power splitter 448 is illustrated as a 1×4 power splitter, primary power splitter 448 may comprise any suitable splitter or combination of splitters such that each ONU 450 receives a copy of the traffic in $\lambda_d$ and $\lambda_v$ and such that the upstream signals from ONUs 450 are combined for communication to OLT 420.

Each secondary power splitter 449 comprises any suitable power splitter, such as an optical coupler or combination of couplers, operable to split a downstream signal and combine an upstream signal. In the downstream direction, each secondary power splitter 449 is operable to receive a signal from primary power splitter 448 and distribute the combined signal to a corresponding group of ONUs 450. In addition, a multiplexer may be added to the network as described in more detail below and secondary power splitters 449 may receive a signal from primary power splitter 448 and the multiplexer. In the upstream direction, each secondary power splitter 449 is operable to receive and combine traffic over time-shared $\lambda_u$ from a corresponding group of ONUs 450, and distribute one copy to primary power splitter 448. It should be noted that although secondary power splitters 449 are represented by 2×4 couplers in the illustrated example, any suitable coupler (or combination of couplers) may be used.

Each ONU 450 (which may be an example of a downstream terminal) may comprise any suitable ONU or ONT. In the illustrated example network, ONU 450 comprises a filter 460, a receiver 462, a filter 470, a receiver 472, and a transmitter 482. Since each ONU 450 in the illustrated example comprises two receivers and one transmitter, it may be referred to as a triplexer. However, any suitable number of transmitters and/or receivers may reside at each ONU. For example, if ONU 450 had one receiver and one transmitter, it may be referred to as a diplexer. Each filter 460 may comprise any suitable filter operable to direct traffic in $\lambda_v$ to a corresponding receiver 462 and to forward traffic in $\lambda_d$ in the downstream direction and $\lambda_u$ in the upstream direction. Each receiver 462 may include any suitable receiver operable to receive traffic in $\lambda_v$ from a corresponding filter 460 and process the traffic. Each filter 470 may comprise any suitable filter operable to direct the traffic in $\lambda_d$ to a corresponding receiver 472 and to forward the traffic in $\lambda_u$ in the upstream direction. Each receiver 472 may include any suitable receiver operable to receive the traffic in $\lambda_d$ from a corresponding filter 470 and process the traffic. Each transmitter 482 may comprise any suitable transmitter operable to transmit the traffic in $\lambda_u$ upstream. ONUs 450 may time-share $\lambda_u$ using a suitable communication protocol to avoid collision of upstream traffic. It should be noted that any suitable number of ONUs 450 may be implemented in PSPON 400.

In operation, in the downstream direction, transmitter 422 of OLT 420 may transmit downstream traffic (for example, analog video) over $\lambda_v$, and transmitter 425 may transmit downstream traffic (for example, digital data) over $\lambda_d$. Filter 428 receives the two signals and forwards the traffic in $\lambda_v$ and directs the traffic in $\lambda_d$ (thereby combining the traffic into one signal) to filter 429. Filter 429 receives the combined signal comprising the traffic in $\lambda_v$ and $\lambda_d$ and allows the signal to forward over fiber 430 to RN 440. Primary power splitter 448 receives the signal comprising the traffic in $\lambda_d$ and $\lambda_v$, splits the traffic into multiple copies (in this example, four copies), and forwards each copy to a corresponding secondary power splitter 449. Each secondary power splitter 449 receives a copy of the signal comprising the traffic in $\lambda_d$ and $\lambda_v$, splits the copy into multiple additional copies (in this example, four additional copies of each copy), and forwards each additional copy over fiber 430 to a corresponding ONU 450. Each ONU 450 receives a copy of the signal comprising the traffic in $\lambda_d$ and $\lambda_v$ at a corresponding filter 460. Each filter 460 forwards the traffic in $\lambda_d$ to filter 470 and directs the traffic in $\lambda_v$ to receiver 462. Filter 470 receives the traffic in $\lambda_d$ and directs it to receiver 472. Receivers 462 and 472 receive and process the traffic in $\lambda_v$ and $\lambda_d$, respectively.

In the upstream direction, transmitter 482 of each ONU 450 transmits traffic over time-shared $\lambda_u$. The traffic in $\lambda_u$ forwards through filters 470 and 460 and over fiber 430 to RN 440. RN 440 receives the traffic in $\lambda_u$ from each ONU 450 at a corresponding secondary power splitter 449. Each secondary power splitter 449 splits the signal into two copies, and forwards one copy to primary power splitter 448. Primary power splitter 448 receives a copy of the upstream signal from each secondary power splitter 449, combines the signals into one signal, and forwards the combined signal to OLT 420. The signal travels over fiber 430 to filter 429 of OLT 420. Filter 429 directs the traffic in $\lambda_u$ to receiver 426. Receiver 426 receives the traffic in $\lambda_u$ and processes it.

Modifications, additions, or omissions may be made to the PSPON 400 described without departing from the scope of the invention. The components of the PSPON 400 described may be integrated or separated according to particular needs. Moreover, the operations of the PSPON 400 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 4:
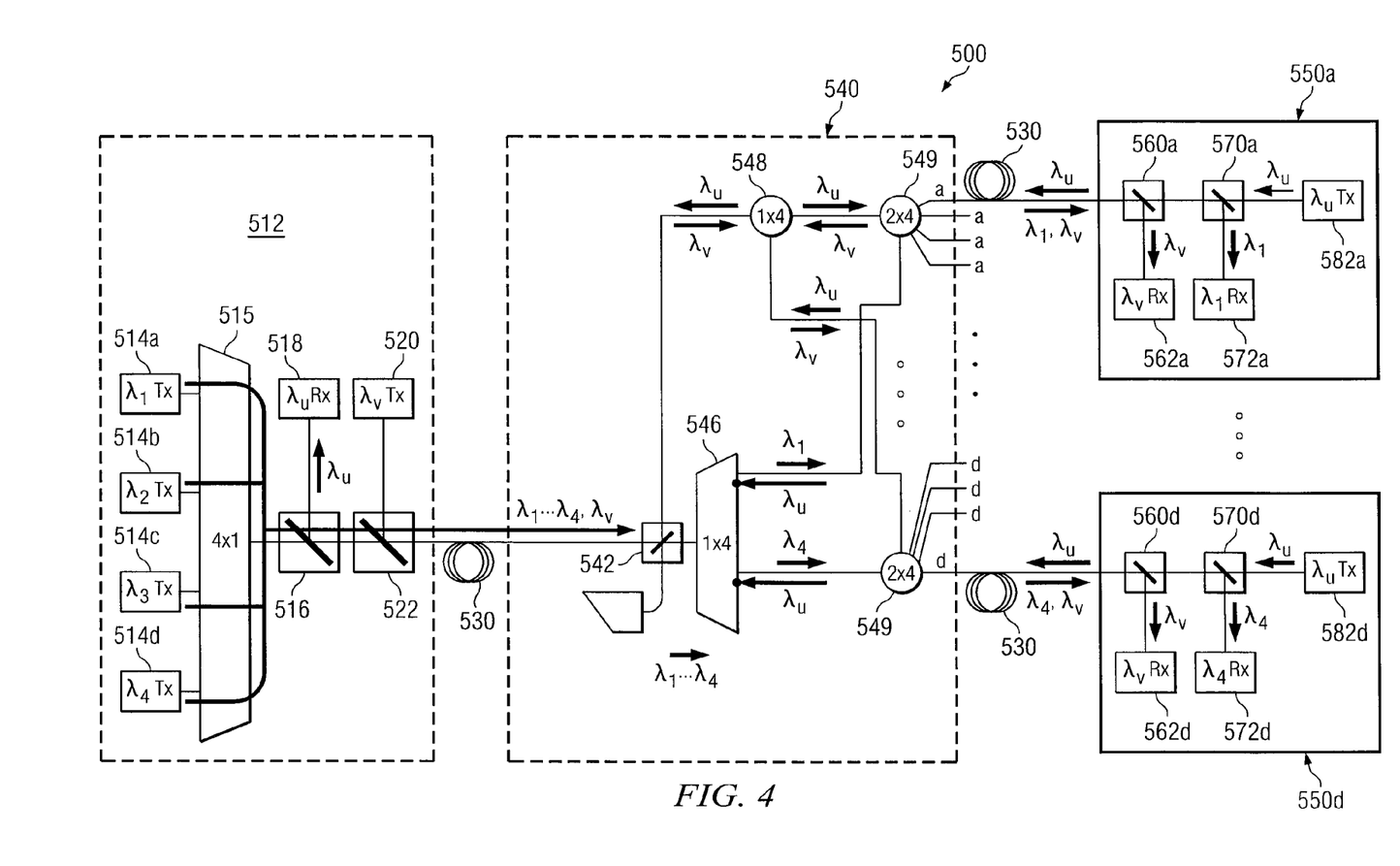
FIG. 4 is a diagram illustrating an example HPON in more detail.

FIG. 4 is a diagram illustrating an example HPON 500. Upgrading each PSPON 400 to HPON 500 may be one solution for providing the needed downstream bandwidth in the example situation above. Example HPON 500 comprises OLT 512, optical fiber 530, RN 540, and ONUs 550 and is a hybrid between a PSPON and a WDMPON. Example HPON 500 provides greater downstream capacity than a PSPON by having groups of two or more ONUs 550 share downstream WDM wavelengths. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

OLT 512 (which may be an example of an upstream terminal) may reside at the carrier's central office and comprises transmitters 514, multiplexer 515, filter 516 and receiver 518, and transmitter 520 and filter 522. Each transmitter 514a-514d may comprise any suitable transmitter and is operable to transmit traffic over a corresponding wavelength, $\lambda_1$-$\lambda_4$, respectively. It should be noted that although example HPON 500 does not provide WDM for upstream traffic, it may be economical to implement transceivers (transmitter and receiver) in OLT 512, instead of only transmitters 514. It should further be noted that although only four transmitters are illustrated in example HPON 500, any suitable number of transmitters (or transceivers) may be included.

Multiplexer 515 comprises any suitable multiplexer/demultiplexer (and may be considered a wavelength router) and is operable to combine the traffic in $\lambda_1$-$\lambda_4$ into one signal. Multiplexer 512 may be a typical N×1 multiplexer operable to receive only the traffic in one wavelength through each port.

Filter 516 comprises any suitable filter operable to receive the traffic in $\lambda_1$-$\lambda_4$ from multiplexer 515 and pass the traffic in $\lambda_1$-$\lambda_4$ to filter 522. In the upstream direction, filter 516 is operable to receive traffic in $\lambda_u$ and direct traffic in $\lambda_u$ to receiver 518. Receiver 518 may comprise any suitable receiver operable to receive and process upstream traffic from ONUs 550 carried over time-shared $\lambda_u$.

Transmitter 520 comprises any suitable transmitter and is operable to transmit traffic over $\lambda_v$ for eventual broadcast to all ONUs 550. Transmitter 520 is further operable to direct the traffic to filter 522. In particular embodiments, transmitter 520 may transmit analog video traffic over $\lambda_v$. In alternative embodiments, transmitter 520 may transmit digital data traffic. It should be noted that, although a single transmitter 520 is illustrated, OLT 512 may comprise any suitable number of transmitters operable to transmit traffic for eventual broadcast to all ONUs 550.

Filter 522 is operable to receive the traffic in $\lambda_v$ and the traffic in $\lambda_1$-$\lambda_4$ and combine the traffic. Filter 522 is also operable to direct the combined traffic over fiber 530 to RN 540. In the upstream direction, filter 522 is operable to receive traffic in $\lambda_u$ and direct the traffic in $\lambda_u$ to filter 516.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 512, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in XU to OLT 512. It should be noted that although RN 540 is referred to as a remote node, "remote" refers to RN 540 being communicatively coupled to OLT 512 and ONUs 550 in any suitable spatial arrangement. A remote node may also generally be referred to as a distribution node.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches). In the upstream direction, filter 542 is operable to receive the traffic in $\lambda_u$ and direct it toward OLT 512.

Multiplexer 546 may comprise any suitable multiplexer/demultiplexer (and may be considered a wavelength router) and is operable to receive the signal comprising the traffic in $\lambda_1$-$\lambda_4$ and demultiplex the signal. Each output port of multiplexer 546 is operable to forward the traffic in a corresponding one of $\lambda_1$-$\lambda_4$ to a corresponding secondary power splitter 549. In the upstream direction, multiplexer 546 is operable to receive and terminate the traffic in $\lambda_u$, as ONUs 550 of example HPON 500 time-share $\lambda_u$ (and do not transmit traffic over multiple upstream wavelengths). Alternatively, multiplexer 546 may forward this traffic to filter 542 for suitable termination (where termination may be performed internally or externally).

Although one multiplexer 546 is illustrated in remote node 540 of FIG. 4, in alternative remote nodes, multiplexer 546 may comprise two or more separate multiplexers receiving downstream signals from one or more upstream sources and forwarding the traffic downstream such that ONUs 550 share wavelengths. It should further be noted that the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths.

Primary power splitter 548 may comprise any suitable power splitter operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 512. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT. Each ONU 550 comprises a filter 560, receiver 562, filter 570, receiver 572, and transmitter 582. Each filter 560 may comprise any suitable filter operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver operable to receive the traffic transmitted in $\lambda_v$ and process the traffic. Each filter 570 may comprise any suitable filter operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter operable to transmit traffic over $\lambda_u$ in the upstream direction, applying a suitable protocol to time-share $\lambda_u$ with the other ONUs 550.

It should be noted that although four ONUs 550 are illustrated as being part of a group of ONUs 550 in HPON 500, any suitable number of ONUs 550 may be part of a group sharing a downstream wavelength. In addition, there may be multiple groups each sharing a different downstream wavelength. For example, ONUs 550a may share $\lambda_1$, ONUs 550b (not illustrated) may share $\lambda_2$, ONUs 550c (not illustrated) may share $\lambda_3$, and ONUs 550d may share $\lambda_4$. Also, one or more ONUs 550 may be a part of more than one group in some networks. It should also be noted that any suitable number of ONUs 550 may be implemented in the network.

In operation, transmitters 514a-514d of OLT 512 transmit traffic at $\lambda_1$-$\lambda_4$, respectively, and forward the traffic to multiplexer 515. Multiplexer 515 combines the traffic in the four wavelengths into one signal and forwards the signal to filter 516. Filter 516 passes the downstream signal to filter 522. Transmitter 20 of OLT 512 also transmits traffic at $\lambda_v$ and forwards the traffic to filter 522. Filter 522 receives the traffic in $\lambda_1$-$\lambda_4$ and $\lambda_v$ and directs the traffic over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$.

Each secondary power splitter 549 thus receives a copy of traffic in $\lambda_4$ from primary power splitter 548 and traffic in a corresponding one of $\lambda_1$-$\lambda_4$ from multiplexer 546, combines the traffic into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. In the illustrated embodiment, ONUs 550a share $\lambda_1$, ONUs 550b (not illustrated) share $\lambda_2$, ONUs 550c (not illustrated) share $\lambda_3$, and ONUs 550d share $\lambda_4$. It should be noted again that the groups of ONUs 550 sharing a wavelength may be different than those illustrated in FIG. 4, and groups of wavelength-sharing ONUs 550 may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over 4. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (e.g., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs 550 does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 512. Fiber 530 carries the traffic in $\lambda_u$ to filter 522 of OLT 512. Filter 522 receives the traffic in $\lambda_u$ and passes the traffic to filter 516. Filter 516 receives the traffic in $\lambda_u$ and directs the traffic toward receiver 518. Receiver 518 receives the traffic and processes it.

Modifications, additions, or omissions may be made to the example HPON 500 described without departing from the scope of the invention. The components of the example HPON 500 described may be integrated or separated according to particular needs. Moreover, the operations of the example HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 5:
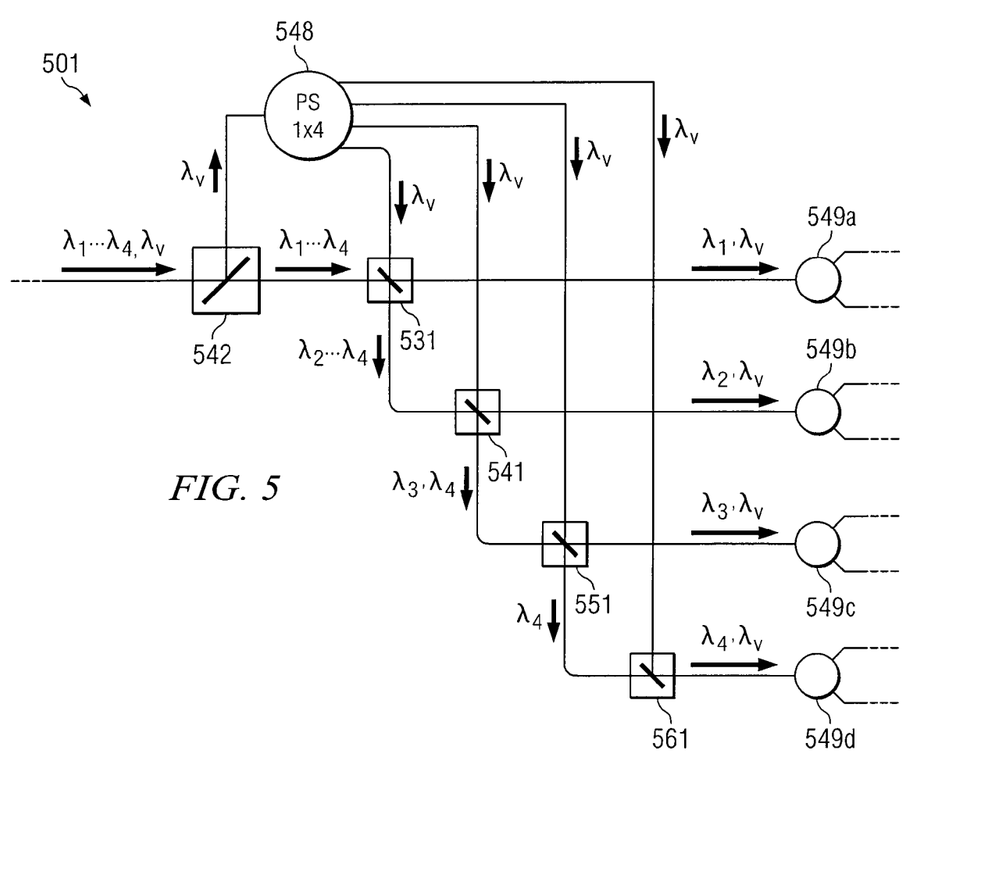
FIG. 5 is a diagram illustrating an example remote node (RN) that may be implemented in an HPON.

FIG. 5 is a diagram illustrating an example RN 501 that may be implemented in an HPON. As described above with reference to FIG. 1, a multiplexer at the RN must be precisely tuned to distribute narrowly spaced dedicated wavelengths (or channels) from the OLT to each ONU and from each ONU to the OLT. Further, the density of the channels requires temperature insensitive multiplexers that may add to the cost of the network. Example RN 501 illustrates an RN that routes wavelengths using a cascading filter arrangement rather than a multiplexer, such as multiplexer 546 described in FIG. 4, thereby providing a potentially less costly RN solution. Example RN 501 of FIG. 5 comprises filter 542, primary power splitter 548, filters 531-561, and secondary power splitters 549. Filter 542 may comprise any suitable filter as described above with reference to FIG. 4. Primary power splitter 548 may comprise any suitable power splitter as described above with reference to FIG. 4. In the illustrated example RN, primary power splitter 548 splits an analog video signal or other traffic in $\lambda_v$ into four copies. Primary power splitter 548 forwards each copy to a corresponding filter, one of filters 531-561 (but may alternatively forward each copy to a corresponding secondary power splitter 549). In the upstream direction, power splitter 548 may be operable to receive traffic in $\lambda_u$ from filters 531-561 (or alternatively, from secondary power splitters 549). If the network provides WDM capabilities upstream, filters 531-561 may be operable to forward the upstream traffic to filter 542 (and may bypass power splitter 548).

Filters 531-561 may comprise any suitable filters (such as, for example, four-port, thin-film filters) or suitable combinations of filters (such as, for example, suitable combinations of three-port filters). Filters 531-561 may be connected using one or more fibers, also referred to as splices. Filter 531 is operable to receive a signal comprising multiple wavelengths from filter 542 and a copy of the signal split by primary power splitter 548. In the illustrated example, filter 531 is operable to receive a signal from filter 542 comprising traffic in $\lambda_1$-$\lambda_4$, forward traffic in $\lambda_1$ to secondary power splitter 549a, and direct traffic in $\lambda_2$-$\lambda_4$ to filter 541. Filter 531 is further operable to receive a copy of traffic in $\lambda_v$ from primary power splitter 548 and forward it to secondary power splitter 549a. Thus, filter 531 may forward traffic in $\lambda_1$ and $\lambda_v$ to secondary power splitter 549a.

Similarly, filter 541 is operable to receive the traffic in $\lambda_2$-$\lambda_4$ from filter 531 and a copy of the traffic in $\lambda_v$ from primary power splitter 548. Filter 541 is further operable to forward the traffic in $\lambda_2$ to secondary power splitter 549b, forward traffic in $\lambda_v$ to secondary power splitter 549b, and direct traffic in $\lambda_3$ and $\lambda_4$ toward filter 551. Thus, filter 541 may forward traffic in $\lambda_2$ and $\lambda_v$ to secondary power splitter 549b.

Likewise, filter 551 is operable to receive traffic in $\lambda_3$ and $\lambda_4$ from filter 541 and a copy of traffic in $\lambda_v$ from primary power splitter 548. Filter 551 is further operable to forward traffic in $\lambda_3$ to secondary power splitter 549c, forward traffic in $\lambda_v$ to secondary power splitter 549c, and direct traffic in $\lambda_4$ toward filter 561. Thus, filter 541 may forward traffic in $\lambda_3$ and $\lambda_v$ to secondary power splitter 549c.

In addition, filter 561 is operable to receive traffic in $\lambda_4$ from filter 551 and a copy of traffic in $\lambda_v$ from primary power splitter 548. Filter 561 is further operable to forward traffic in $\lambda_4$ and traffic in $\lambda_v$ to secondary power splitter 549d. Any remaining wavelengths may be terminated. Because each of filters 531-561 forwards a wavelength and directs the remaining wavelengths (if any) to downstream filters (if any), the filters may be referred to as "cascaded" filters. It should be noted that any suitable number of wavelengths may be forwarded by one or more filters to a secondary power splitter. It should further be noted that there may be any suitable number of chains of cascaded filters in an RN.

Each secondary power splitter 549 is operable to receive a signal from a corresponding filter (one of filters 531-561), split the signal into a suitable number of copies, and forward each copy to a suitable number of ONUs. A suitable number of additional couplers may be used to further split the signals such that each ONU receives a suitable signal. It should be noted that, in an alternative example RN, copies of the broadcast traffic in $\lambda_v$ may be forwarded by primary power splitter 548 to secondary power splitters 549 instead of being forwarded to the filters themselves.

In operation, filter 542 receives a signal comprising traffic in $\lambda_1$-$\lambda_4$ and $\lambda_v$, directs traffic in $\lambda_v$ toward primary power splitter 548 and forwards traffic in the remaining wavelengths, $\lambda_1$-$\lambda_4$, to filter 531. Primary power splitter 548 receives the signal comprising the traffic in $\lambda_v$ and splits the signal into a suitable number of copies. In the illustrated example RN, primary power splitter 548 splits the signal into four copies and forwards each copy to a corresponding one of filters 531-561. Filter 531 receives the signal comprising the traffic in $\lambda_1$-$\lambda_4$ from filter 542 and a copy of the traffic in $\lambda_v$ from primary power splitter 548. Filter 531 forwards the traffic in $\lambda_1$ to secondary power splitter 549a, directs the traffic in $\lambda_2$-$\lambda_4$ toward filter 541, and forwards the traffic in $\lambda_v$ toward secondary power splitter 549a. Filter 541 receives the signal comprising the traffic in $\lambda_2$-$\lambda_4$ from filter 531 and a copy of the traffic in $\lambda_v$ from primary power splitter 548. Filter 541 forwards traffic in $\lambda_2$ to secondary power splitter 549b, directs traffic in $\lambda_3$ and $\lambda_4$ toward filter 551, and forwards traffic in $\lambda_v$ toward secondary power splitter 549b. Filter 551 receives the signal comprising traffic in $\lambda_3$ and $\lambda_4$ from filter 541 and a copy of traffic in $\lambda_v$ from primary power splitter 548. Filter 551 forwards traffic in $\lambda_3$ to secondary power splitter 549c, directs traffic in $\lambda_4$ toward filter 561, and forwards traffic in $\lambda_v$ toward secondary power splitter 549c. Filter 561 receives the signal comprising traffic in $\lambda_4$ from filter 551 and a copy of traffic in $\lambda_v$ from primary power splitter 548. Filter 561 forwards traffic in $\lambda_4$ and traffic in $\lambda_v$ to secondary power splitter 549d. Filter 561 may suitably terminate any remaining wavelengths. Although in the illustrated example RN 501 there are no other filters in the cascade, alternative RNs may have more or less wavelengths to route (and thus filters). Each secondary power splitter 549 receives a signal comprising the traffic in $\lambda_v$ and the traffic in a corresponding one of $\lambda_1$-$\lambda_4$ and splits the signal into a suitable number of copies. A suitable number of additional couplers may further split the signals such that each ONU receives a suitable signal.

Example RN 501 may perform wavelength routing without the use of a multiplexer. By not using a multiplexer, RN 501 may be less costly (while providing comparable performance) than RNs that do use a multiplexer. However, the number of fiber interconnections required to connect the filters 531-561 are costly and the differences in temperature between each filter 531-561 may reduce relative wavelength accuracy.

Particular embodiments of the present invention solve these problems by combining the filters into an integrated filter module. The integrated filter module may comprise a substrate that reflects filtered light of particular wavelengths to a collimated fiber array. The shared substrate reduces the number of costly fiber interconnections and ensures that any temperature drift of the optical characteristics of the ports is consistent. Additional details of example embodiments of the present invention are described in greater detail below.

Figure 6A:
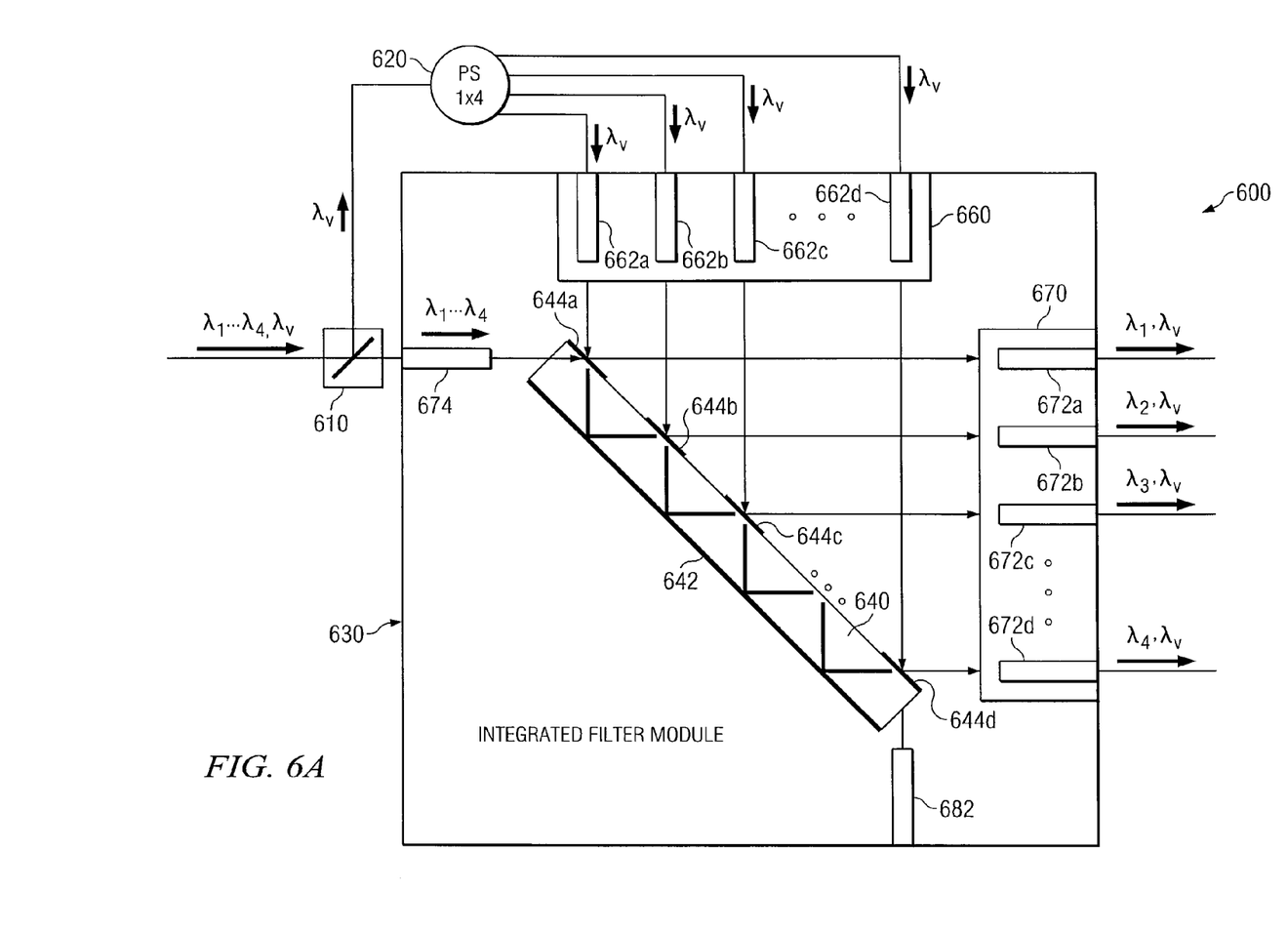
FIGS. 6A and 6B are diagrams illustrating example RNs that use an integrated filter module to communicate traffic.
Figure 6B:
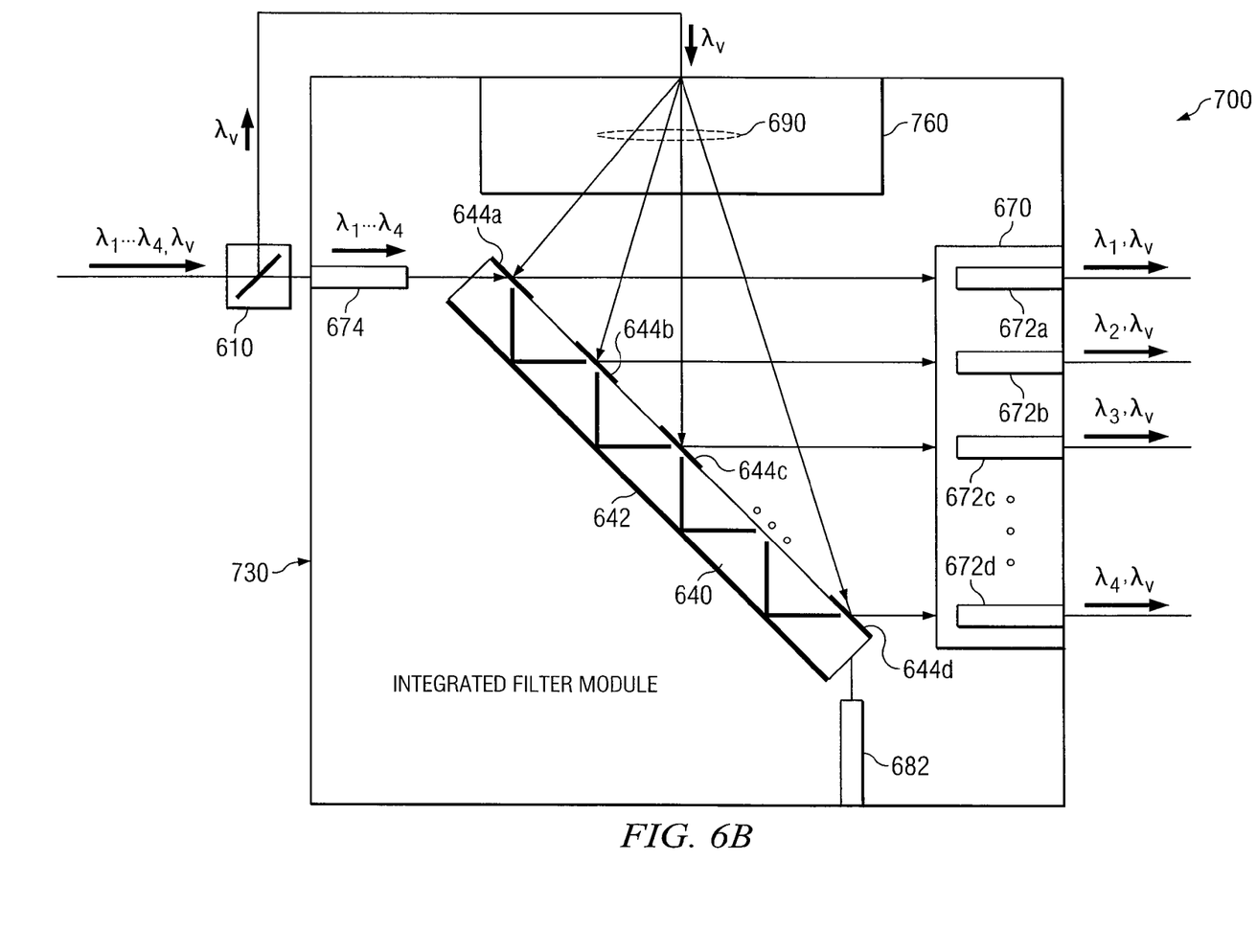

FIGS. 6A and 6B are diagrams illustrating example RNs that use an integrated filter module to route traffic. Example RN 600 of FIG. 6A comprises a filter 610, a primary power splitter 620, and an integrated filter module 630. Filter 610 may comprise any suitable filter and may be substantially similar to filter 542 of FIG. 5. Primary power splitter 620 may comprise any suitable power splitter and may be substantially similar to primary power splitter 548 of FIG. 5.

Integrated filter module 630 comprises a substrate 640 with a mirror 642 on a lower surface and thin-films 644 on an upper surface. Substrate 640 may comprise any suitable material for transmitting light, such as glass. Substrate 640 may comprise anti-reflection coating on the sides where $\lambda_1$-$\lambda_4$ enter substrate 640 and where any remaining wavelengths exit the substrate to fiber absorber 682. Mirror 642 may comprise any suitable material, such as metal or a dielectric material, operable to reflect light.

Thin-films 644 may comprise any suitable layers of material operable to reflect light in certain wavelengths and transmit light in other wavelengths. For example, thin-film 644a may comprise an alternating layer stack of two suitable materials and film thicknesses and thin-film 644b may comprise an alternating layer stack of the same materials with different film thicknesses. Examples of the thin-film material and layering process are described in U.S. Pat. No. 6,819,871 entitled "Multi-channel optical filter and multiplexer formed from stacks of thin-film layers." Any suitable material and fabrication process can be used to fabricate the filters. The dimensions are in the order of millimeters, for instance 2×10 mm, but length depends on the number of wavelengths. The dimensions depend on the size of the collimator.

In particular embodiments, each thin-film 644 may receive one or more wavelengths at a first port and reflect all wavelengths except a specific one. As described in detail below, a first thin-film 644 may receive $\lambda_1$-$\lambda_4$. The first thin-film 644 may pass $\lambda_1$ and reflect the remaining wavelengths $\lambda_2$-$\lambda_4$. This allows light of only one wavelength in an incoming WDM signal to be forwarded for a particular thin-film 644. Thin-films 644 may be further operable to receive traffic in $\lambda_v$ a second port and to reflect the traffic in $\lambda_v$ in the same direction as the transmitted wavelength. As described in detail below, each of the thin-films may receive and reflect the traffic in $\lambda_v$. For example, the first thin-film 644 may pass $\lambda_1$ and reflect $\lambda_v$ in the same direction. Accordingly, teachings of some embodiments of the invention recognize that utilization of various thin-film layers on a substrate may provide sufficient transmission of certain wavelengths similar to the cascaded filters described in FIG. 5.

Integrated filter module 630 further comprises collimated fiber arrays 660 and 670. Collimated fiber arrays 660 and 670 may comprise any suitable array of collimated fibers 662 and 672 capable of collimating light beams so as to only allow the wavelengths traveling parallel to a specified direction through the array. In the illustrated embodiment, collimated fiber array 660 comprises fibers 662 that receive traffic in $\lambda_v$ from power splitter 620 and transmit the traffic toward substrate 640. Collimated fiber array 670 comprises fibers 672 that receive the traffic in $\lambda_1$-$\lambda_4$ and $\lambda_v$ from substrate 640 and transmit the traffic as output. Integrated filter module 630 further comprises a collimated fiber 674 that receives the input from filter 610 and transmits the traffic to substrate 640.

Integrated filter module 630 further comprises fiber absorber 682. Fiber absorber 682 may comprise any suitable device that terminates any remaining wavelengths reflected by thin-film 644d. For example, wavelengths received by filter 610 and not passed by any thin-films 644 will emerge at the bottom of substrate 640. Fiber absorber 682 absorbs those wavelengths not transmitted by thin-films 644. Alternatively, fiber absorber 682 may forward any remaining wavelengths to another module.

In operation, filter 610 receives a signal comprising traffic in $\lambda_1$-$\lambda_4$ and $\lambda_v$ (as examples only), directs traffic in $\lambda_v$ toward primary power splitter 620 and forwards traffic in the remaining wavelengths, $\lambda_1$-$\lambda_4$, to integrated filter module 630. Primary power splitter 620 receives the signal comprising the traffic in $\lambda_v$ and splits the signal into a suitable number of copies. In the illustrated example RN, primary power splitter 620 splits the signal into four copies and forwards each copy to a corresponding one of collimated fibers 662 of array 660. Integrated filter module 630 receives, at substrate 640, the signal comprising the traffic in $\lambda_1$-$\lambda_4$ from filter 610 via collimated fiber 674 and copies of the traffic in $\lambda_v$ from primary power splitter 620 via array 660. Thin-film 644a passes the traffic in $\lambda_1$ toward collimated fiber 672a. Thin-film 644a reflects the traffic in $\lambda_2$-$\lambda_4$ through substrate 640 toward mirror 642 and reflects a copy of the traffic in $\lambda_v$ toward collimated fiber 672a.

Mirror 642 reflects the traffic in $\lambda_2$-$\lambda_4$ through substrate 640 toward thin-film 644b. Thin-film 644b receives the signal comprising the traffic in $\lambda_2$-$\lambda_4$ and passes the traffic in $\lambda_2$ toward collimated fiber 672b. Thin-film 644b reflects the traffic in $\lambda_3$ and $\lambda_4$ toward mirror 642 and reflects a copy of the traffic in $\lambda_v$ toward collimated fiber 672b.

Mirror 642 reflects the traffic in $\lambda_3$ and $\lambda_4$ through substrate 640 toward thin-film 644c. Thin-film 644c receives the signal comprising the traffic in $\lambda_3$ and $\lambda_4$ and passes the traffic in $\lambda_3$ toward collimated fiber 672c. Thin-film 644c reflects the traffic in $\lambda_4$ toward mirror 642 and reflects a copy of the traffic in $\lambda_v$ toward collimated fiber 672c.

Mirror 642 reflects the traffic in $\lambda_4$ toward thin-film 644d. Thin-film 644d receives the signal comprising the traffic in $\lambda_4$ and passes the traffic in $\lambda_4$ toward collimated fiber 672d. Thin-film 644d reflects remaining wavelengths, if they exist from the original multiplexed signal, toward fiber absorber 682 and reflects a copy of the traffic in $\lambda_v$ toward collimated fiber 672d. Thus, collimated fiber array 670 receives a demultiplexed signal comprising the traffic in $\lambda_v$ and the traffic in a corresponding one of $\lambda_1$-$\lambda_4$ for each of its fibers. Each fiber of collimated fiber array 670 may forward the received traffic to an associated a secondary power splitter, such as power splitter 549 of FIG. 5. Any suitable number and type of wavelengths may be received and transmitted by integrated filter module 630.

FIG. 6B illustrates an additional example RN 700 that uses an integrated filter module 730 with an optical power spreading device 760 in place of array 660 of FIG. 6A. Optical power spreading device 760 may comprise any suitable device, such as a lens or a diffraction grating, that is operable to receive a wavelength and distribute the wavelength to each thin-film 644. In the illustrated embodiment, optical power spreading device 760 receives traffic in $\lambda_v$ and optical power spreading device 760 is operable to distribute the received signal in $\lambda_v$ over substrate 640 such that each thin-film 644 receives traffic in $\lambda_v$, as indicated by reference number 690. It should be noted that optical power spreading device 760 may receive and transmit any suitable number of wavelengths.

Although the present invention has been described with several embodiments, various changes and modifications may be suggested to one skilled in the art. It is intended that the present invention encompass such changes and modifications as fall within the scope of the appended claims.

What is claimed is:

1. A distribution node for an optical network, comprising:
    an integrated filter module comprising at least a first thin-film and a second thin-film coupled to a common substrate and operable to:
        receive a first downstream signal at the substrate comprising at least traffic in a first wavelength and a second wavelength;
        transmit at least the traffic comprising the first wavelength from the first thin-film to a first plurality of downstream terminals;
        reflect the traffic comprising the second wavelength to the second thin-film; and
        transmit at least the traffic comprising the second wavelength from the second thin-film to a second plurality of downstream terminals; and
    a traffic distributor operable to:
        receive a second downstream signal comprising at least traffic in a third wavelength; and
        forward the traffic comprising the third wavelength to the common substrate for distribution to at least the first plurality and second plurality of downstream terminals.

2. The distribution node of claim 1, wherein the traffic distributor comprises a power splitter, wherein the power splitter is operable to split the traffic comprising the third wavelength into a plurality of copies.

3. The distribution node of claim 2, wherein the integrated filter module is further operable to:
    receive the plurality of copies of the traffic comprising the third wavelength from the power splitter at the substrate, such that at least the first thin-film and the second thin-film receives a copy of the traffic comprising the third wavelength;
    reflect the traffic comprising the third wavelength from the first thin-film to the first plurality of downstream terminals; and
    reflect the traffic comprising the third wavelength from the second thin-film to the second plurality of downstream terminals.

4. The distribution node of claim 2, wherein the integrated filter module comprises a first collimated fiber array, wherein the first collimated fiber array is operable to receive the plurality of copies of the traffic comprising the third wavelength from the power splitter, such that each fiber of the first collimated fiber array receives a copy of the traffic comprising the third wavelength.

5. The distribution node of claim 2, wherein the integrated filter module comprises a second collimated fiber array, wherein the second collimated fiber array is operable to:
    transmit traffic from a first fiber of the second collimated fiber array to the first plurality of downstream terminals; and
    transmit traffic from a second fiber of the second collimated fiber array to the second plurality of downstream terminals.

6. The distribution node of claim 1, wherein the traffic distributor comprises an optical power spreading device, wherein the optical power spreading device is operable to receive the traffic comprising the third wavelength and distribute the traffic comprising the third wavelength over the common substrate, such that at least the first thin-film and the second thin-film receives the traffic comprising the third wavelength.

7. The distribution node of claim 6, wherein the integrated filter module is further operable to:
    receive the traffic comprising the third wavelength from the optical power spreading device at the substrate, such that at least the first thin-film and the second thin-film receives the traffic comprising the third wavelength;
    reflect the traffic comprising the third wavelength from the first thin-film to the first plurality of downstream terminals; and
    reflect the traffic comprising the third wavelength from the second thin-film to the second plurality of downstream terminals.

8. The distribution node of claim 6, wherein the integrated filter module comprises a second collimated fiber array, wherein the second collimated fiber array is operable to:
    transmit traffic from a first fiber of the second collimated fiber array to the first plurality of downstream terminals; and
    transmit traffic from a second fiber of the second collimated fiber array to the second plurality of downstream terminals.

9. A method for communicating traffic in an optical network, comprising:
    providing an integrated filter module comprising at least a first thin-film and a second thin-film coupled to a common substrate;
    receiving a first downstream signal at the substrate comprising at least traffic in a first wavelength and a second wavelength;
    transmitting at least the traffic comprising the first wavelength from the first thin-film to a first plurality of downstream terminals;
    reflecting the traffic comprising the second wavelength to the second thin-film;
    transmitting at least the traffic comprising the second wavelength from the second thin-film to a second plurality of downstream terminals;
    receiving a second downstream signal at a traffic distributor, the second downstream signal comprising at least traffic in a third wavelength; and
    forwarding the traffic comprising the third wavelength to the common substrate for distribution to at least the first plurality and second plurality of downstream terminals.

10. The method of claim 9, wherein the traffic distributor comprises a power splitter, wherein the power splitter is operable to split the traffic comprising the third wavelength into a plurality of copies.

11. The method of claim 10, further comprising:
    receiving the plurality of copies of the traffic comprising the third wavelength from the power splitter at the substrate, such that at least the first thin-film and the second thin-film receives a copy of the traffic comprising the third wavelength;
    reflecting the traffic comprising the third wavelength from the first thin-film to the first plurality of downstream terminals; and
    reflecting the traffic comprising the third wavelength from the second thin-film to the second plurality of downstream terminals.

12. The method of claim 10, wherein the integrated filter module comprises a first collimated fiber array, wherein the first collimated fiber array is operable to receive the plurality of copies of the traffic comprising the third wavelength from the power splitter, such that each fiber of the first collimated fiber array receives a copy of the traffic comprising the third wavelength.

13. The method of claim 10, wherein the integrated filter module comprises a second collimated fiber array and further comprising:
  transmitting traffic from a first fiber of a second collimated fiber array to the first plurality of downstream terminals; and
  transmitting traffic from a second fiber of a second collimated fiber array to the second plurality of downstream terminals.

14. The method of claim 9, wherein the traffic distributor comprises an optical power spreading device, wherein the optical power spreading device is operable to receive the traffic comprising the third wavelength and distribute the traffic comprising the third wavelength over the common substrate, such that at least the first thin-film and the second thin-film receives the traffic comprising the third wavelength.

15. The method of claim 14, further comprising:
  receiving the traffic comprising the third wavelength from the optical power spreading device at the substrate, such that at least the first thin-film and the second thin-film receives the traffic comprising the third wavelength;
  reflecting the traffic comprising the third wavelength from the first thin-film to the first plurality of downstream terminals; and
  reflecting the traffic comprising the third wavelength from the second thin-film to the second plurality of downstream terminals.

16. The method of claim 14, wherein the integrated filter module comprises a second collimated fiber array and further comprising:
  transmitting traffic from a first fiber of the second collimated fiber array to the first plurality of downstream terminals; and
  transmitting traffic from a second fiber of the second collimated fiber array to the second plurality of downstream terminals.

17. A system for communicating traffic in an optical network, comprising:
  means for providing an integrated filter module comprising at least a first thin-film and a second thin-film coupled to a common substrate;
  means for receiving a first downstream signal at the substrate comprising at least traffic in a first wavelength and a second wavelength;
  means for transmitting at least the traffic comprising the first wavelength from the first thin-film to a first plurality of downstream terminals;
  means for reflecting the traffic comprising the second wavelength to the second thin-film;
  means for transmitting at least the traffic comprising the second wavelength from the second thin-film to a second plurality of downstream terminals;
  means for receiving a second downstream signal at a traffic distribution means, the second downstream signal comprising at least traffic in a third wavelength; and
  means for forwarding the traffic comprising the third wavelength to the common substrate for distribution to at least the first plurality and second plurality of downstream terminals.

18. The system of claim 17, wherein the traffic distribution means comprises a power splitter, wherein the power splitter is operable to split the traffic comprising the third wavelength into a plurality of copies.

19. The system of claim 17, wherein the traffic distribution means comprises an optical power spreading device, wherein the optical power spreading device is operable to receive the traffic comprising the third wavelength and distribute the traffic comprising the third wavelength over the common substrate, such that at least the first thin-film and the second thin-film receives the traffic comprising the third wavelength.

20. The system of claim 17, further comprising:
  means for receiving the traffic comprising the third wavelength from the traffic distribution means at the substrate, such that at least the first thin-film and the second thin-film receives the traffic comprising the third wavelength;
  means for reflecting the traffic comprising the third wavelength from the first thin-film to the first plurality of downstream terminals; and
  means for reflecting the traffic comprising the third wavelength from the second thin-film to the second plurality of downstream terminals.

* * * * *